United States Patent [19]
Rührig

[11] Patent Number: 5,986,926
[45] Date of Patent: Nov. 16, 1999

[54] IDENTIFICATION ELEMENT AND METHOD OF MANUFACTURING AN IDENTIFICATION ELEMENT

[75] Inventor: Manfred Rührig, Weinheim, Germany

[73] Assignee: Meto International GmbH, Hirschhorn, Germany

[21] Appl. No.: 09/102,278

[22] Filed: Jun. 22, 1998

[30] Foreign Application Priority Data

Aug. 27, 1997 [DE] Germany .................. 197 37 342

[51] Int. Cl.⁶ .................................................. G11C 11/14
[52] U.S. Cl. ............................................ 365/172; 365/158
[58] Field of Search ................................ 365/172, 171, 365/158, 173

[56] References Cited

U.S. PATENT DOCUMENTS 5,060,193  10/1991  Daughton et al. .................. 365/173

*Primary Examiner*—David Nelms
*Assistant Examiner*—David Lam
*Attorney, Agent, or Firm*—Jones, Tullar & Cooper, P.C.

[57] ABSTRACT

The present invention is directed to an identification element comprising a layer of an anisotropic magnetic material exhibiting a preferred axis (x), high permeability and low coercive force (soft magnetic material), which on the application of an external alternating magnetic field generates a characteristic signal (A(t)), which signal (A(t)) is at its maximum level when the preferred axis (x) of the identification element is oriented parallel to the external alternating magnetic field, and further comprising a layer of a magnetic material of low permeability and high coercive force (semihard or hard magnetic material) which is arranged on the soft magnetic material or in the immediate proximity thereof, with the semihard or hard magnetic material having regions differing in magnetization.

7 Claims, 3 Drawing Sheets

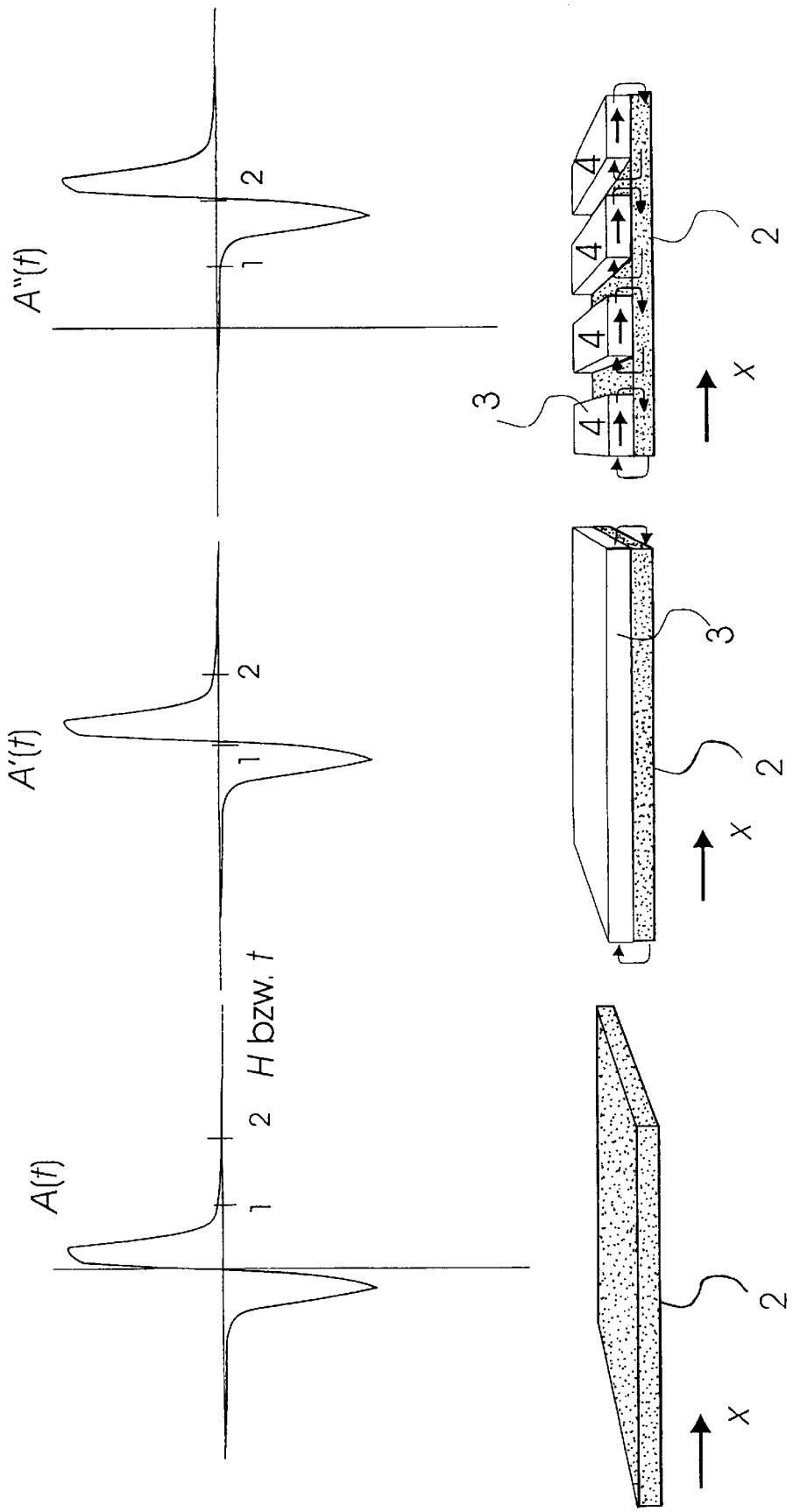

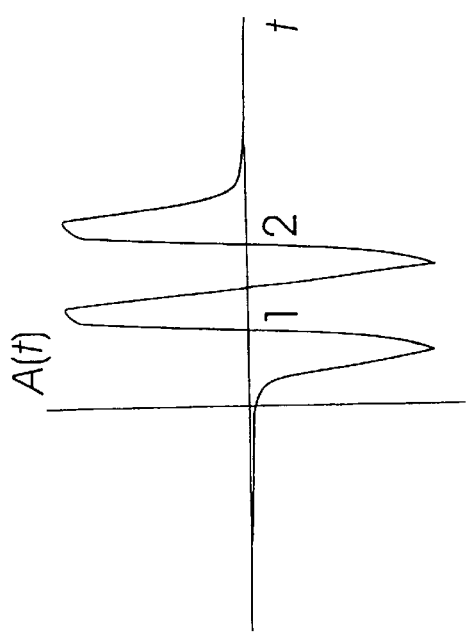
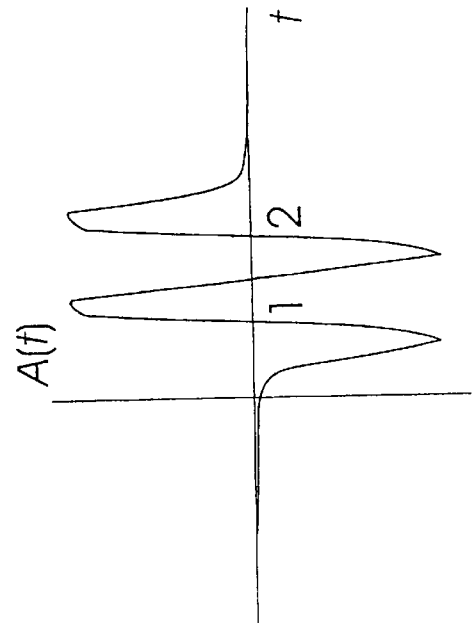
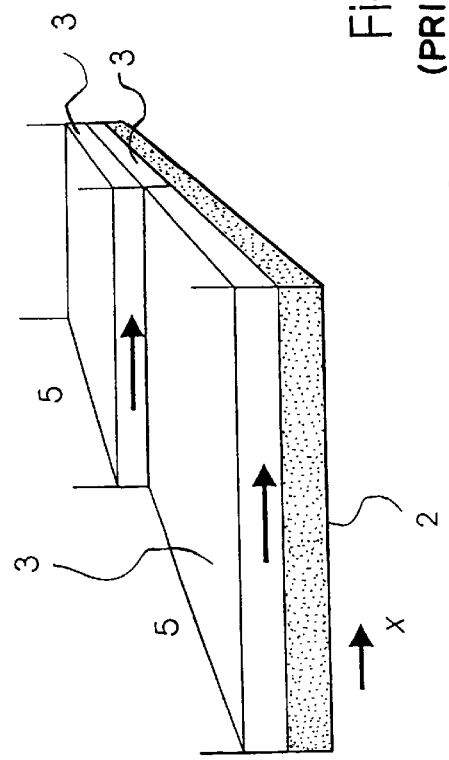
Fig. 2a
(PRIOR ART)
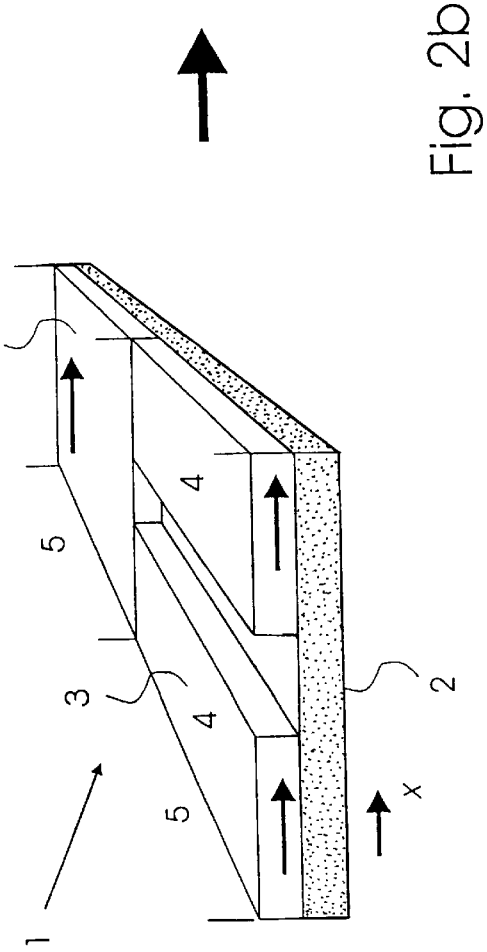
Fig. 2b

IDENTIFICATION ELEMENT AND METHOD OF MANUFACTURING AN IDENTIFICATION ELEMENT

BACKGROUND OF THE INVENTION

1. Field of the Invention

This invention relates to an identification element comprising a layer of an anisotropic magnetic material exhibiting a preferred axis, high permeability and low coercive force (soft magnetic material), which on the application of an external alternating magnetic field generates a characteristic signal which is at its maximum level when the preferred axis of the identification element is oriented parallel to the external alternating magnetic field. The identification element further comprises a layer of a magnetic material of low permeability and high coercive force (semihard or hard magnetic material) which is arranged on the soft magnetic material or in the immediate proximity thereof, with the semihard or hard magnetic material having regions differing in magnetization. The present invention further relates to a method of manufacturing such an identification element.

2. Background Art

Electronic article surveillance as a means for preventing inventory losses in department stores and warehouses is becoming increasingly popular. A plurality of different security elements are known in the art. A particularly advantageous embodiment of a security element is known from European patent specification EP 0 295 028 B1. This patent specification describes labels referred to as thin-film labels. These labels comprise a thin layer of a soft magnetic material lying preferably in the $\mu$m range. The layer is applied to a substrate using, for example, a physical deposition method under vacuum conditions.

Thin-film labels exhibit an anisotropic structure. Anisotropic means that the soft magnetic layer of which the thin-film labels are formed has a preferred axis. In practice, the anisotropic structure will be noticed in that the characteristic signal remitted by the thin-film label in response to an interrogating field is at a maximum level when the interrogating field and the preferred axis are in parallel alignment; by contrast, the signal will disappear when the preferred axis and the interrogating field are normal to each other.

An analogous behavior is also present in security elements referred to as strip security elements which comprise a soft magnetic material in strip form. Here, too, the characteristic signal is at a maximum level when the interrogating field and the strip are in parallel alignment, the signal disappearing in the presence of an orientation perpendicular to each other. It will be understood that the strip security element may also be a length of drawn wire.

A plurality of different methods for detecting the presence of security elements in an interrogation zone are known in the art. Thus it is suggested in European patent specification EP 123 586 B to emit into the interrogation zone, in addition to two interrogating fields with the frequencies f1 and f2 in the kilohertz range, a field with a frequency that lies in the hertz range. The two interrogating fields with the frequencies f1 and f2 incite a security element present in the interrogation zone to emit a characteristic signal with the intermodulation frequencies n·f1±m·f2 (where n, m=0, 1, 2, . . . ). The low-frequency interrogating field causes the security element to be driven from saturation in one direction into saturation in the other direction at the clock rate of this particular field. Hence the characteristic signal occurs cyclically at the frequency of the low-frequency field.

As an alternative solution, it is also known to use only one interrogating field in the kilohertz range for excitation of the security element, with the characteristic signal of the security element occurring again at the clock rate of a low-frequency field cycling the soft magnetic material between the two states of saturation.

From published international application WO 97/04338 it is known to configure a security element in such fashion that apart from serving the function of protecting an article against pilferage, it has the added capability of identifying the suitably protected article. For this purpose, the semihard or hard magnetic material is magnetized with a nonuniform field pattern. By reason of the field pattern of the permanently magnetizable material, the characteristic signal of the soft magnetic material can be varied selectively in a wide variety of ways.

SUMMARY OF THE INVENTION

Proceeding from this state of the art, it is an object of the present invention to provide a low-cost identification element and a method of manufacturing such an identification element.

This object is accomplished with regard to the identification element in that the regions extend normal to the preferred axis of the soft magnetic material, and that in these regions sections of the semihard or hard magnetic material are arranged to have a gap therebetween, with the sections in the individual regions differing in length in the direction of the preferred axis of the soft magnetic material.

In an advantageous embodiment of the identification element of the present invention, provision is made for the semihard or hard magnetic material to exhibit the same intensity of magnetic bias in all regions. This feature enables the use of a standard material without the need for further magnetization of the material. Preferably, the semihard or hard magnetic material is in a state of saturation.

With regard to the method of manufacturing an identification element, the object of the present invention is accomplished in that the regions are arranged normal to the preferred direction of the soft magnetic material, and that in these regions sections of the semihard or hard magnetic material are arranged to have a gap therebetween, with the sections in the individual regions differing in length in the direction of the preferred axis of the soft magnetic material.

In a low-cost further aspect of the method of the present invention, the semihard or hard magnetic material is applied to the soft magnetic material in the form of a continuous layer; then the semihard or hard magnetic material is removed in the individual regions, such that sections of different lengths are produced in the individual regions; these sections are spaced from each other by a predetermined distance. In this method it is an advantage to remove the semihard or hard magnetic material between the sections by mechanical means (for example, by scratching out or punching out, etc.). Alternatively, the possibility exists of removing the semihard or hard magnetic material between the sections by means of photo-chemical action.

In a further embodiment of the method of the present invention, provision is made for the semihard or hard magnetic material to be impressed in the open pattern intended for the particular region.

BRIEF DESCRIPTION OF THE DRAWINGS

The present invention will be explained in more detail in the following with reference to the accompanying drawings. In the drawings, FIG. 1a is a view of a security element made of a soft magnetic material and a schematic illustration of its characteristic signal (prior art);

FIG. 1b is a view of a deactivatable security element made of a soft magnetic material and a schematic illustration of its characteristic signal (prior art);

FIG. 1c is a view of a security element of the present invention and a schematic illustration of its characteristic signal;

FIG. 2a is a view of an identification element and a schematic illustration of its characteristic signal (prior art);

FIG. 2b is an embodiment of the identification element of the present invention and a schematic illustration of its characteristic signal;

DESCRIPTION OF THE PREFERRED EMBODIMENTS

FIG. 1a shows a security element known in the art that is made of a soft magnetic material 2, and a schematic illustration of its characteristic signal A(t). The diagram reflects the response, that is, the amplitude variation of the soft magnetic material 2 with time, to an external alternating magnetic field. As mentioned previously, the soft magnetic material 2 is driven from saturation in one direction into saturation in the other direction by the alternating field. Related to the hysteresis curve, the peaks of the characteristic signal occur when the linear region is left and the soft magnetic material 2 goes into saturation in the one or the other direction. Due to the symmetry of the hysteresis curve, the characteristic signal A(t) of FIG. 1a goes essentially symmetrically towards zero.

The application of a magnetically biased semihard or hard magnetic material 3 to the soft magnetic material 2 has the effect of shifting the characteristic signal A(t) in the direction of the axis t as illustrated in FIG. 1b. This means that a detecting device tuned to the signal A(t) shown in FIG. 1a is no longer in a position to detect the shifted signal A'(t). Incidentally, the state of the art utilizes this effect to deactivate soft magnetic security elements.

As becomes apparent from FIG. 1c, the shift of the characteristic signal A"(t) can be varied within wide limits by subdividing the semihard or hard magnetic material 3 into individual sections 4 in the direction of the preferred axis x of the soft magnetic material 2, rather than forming a continuous layer, with the length (a) of the sections 4 in the direction of the preferred axis x determining the amount of shift of the characteristic signal A"(t) on the axis t. As will be explained in more detail in the following, the invention utilizes this effect to configure a security element as an identification element 1.

Figure 3A:
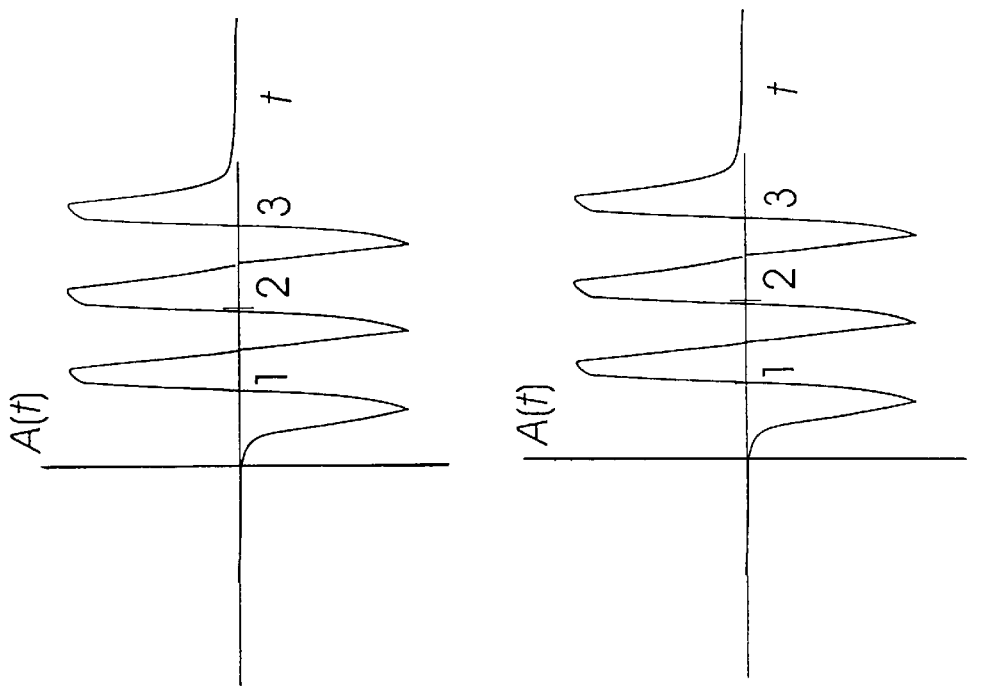
FIG. 3a is a view of a further identification element and a schematic illustration of its characteristic signal (prior art)

From published international application WO 97/04338 it is known to magnetize the semihard or hard magnetic material with a nonuniform field pattern. By virtue of the nonuniform field pattern of the permanently magnetizable material 3, the characteristic signal A(t) of the soft magnetic material 2 can be varied selectively in a variety of ways. Because of the different identification, an article provided with a corresponding identification element 1 is distinguishable from other articles. As illustrated in FIG. 2a and FIG. 3a, the technique for producing the field pattern of WO 97/04338 comprises applying semihard or hard magnetic material 3 of different thicknesses to different regions 5, or providing the regions 5 with different magnetization strengths. Typically, semihard or hard magnetic material 3 has a predetermined thickness. This applies in particular to commercially available strip recording material. To save the extra cost for custom-built items, it is necessary to arrange several layers of semihard or hard magnetic material 3 one upon the other to accomplish layer thicknesses of some magnitude. This shows clearly the shortcomings of the solution known from WO 97/04338: high material consumption and elaborate manufacture. Moreover, a further problem results: With greater layer thicknesses the upper volume fractions are no longer sufficient to bias the soft magnetic layer 2 underneath. Naturally, this type of saturation imposes significant limits on the variation possibilities for identification elements 1. A still further disadvantage of the solution known from the art resides in that the identification elements 1 manufactured in the proposed manner are not only relatively thick but also differ in thickness in different regions 5, which seriously aggravates their integration into labels.

It is equally disadvantageous to arrange materials with different magnetization strengths in the individual regions as this solution, too, pushes up the cost of identification elements 1 seriously.

Figure 3B:
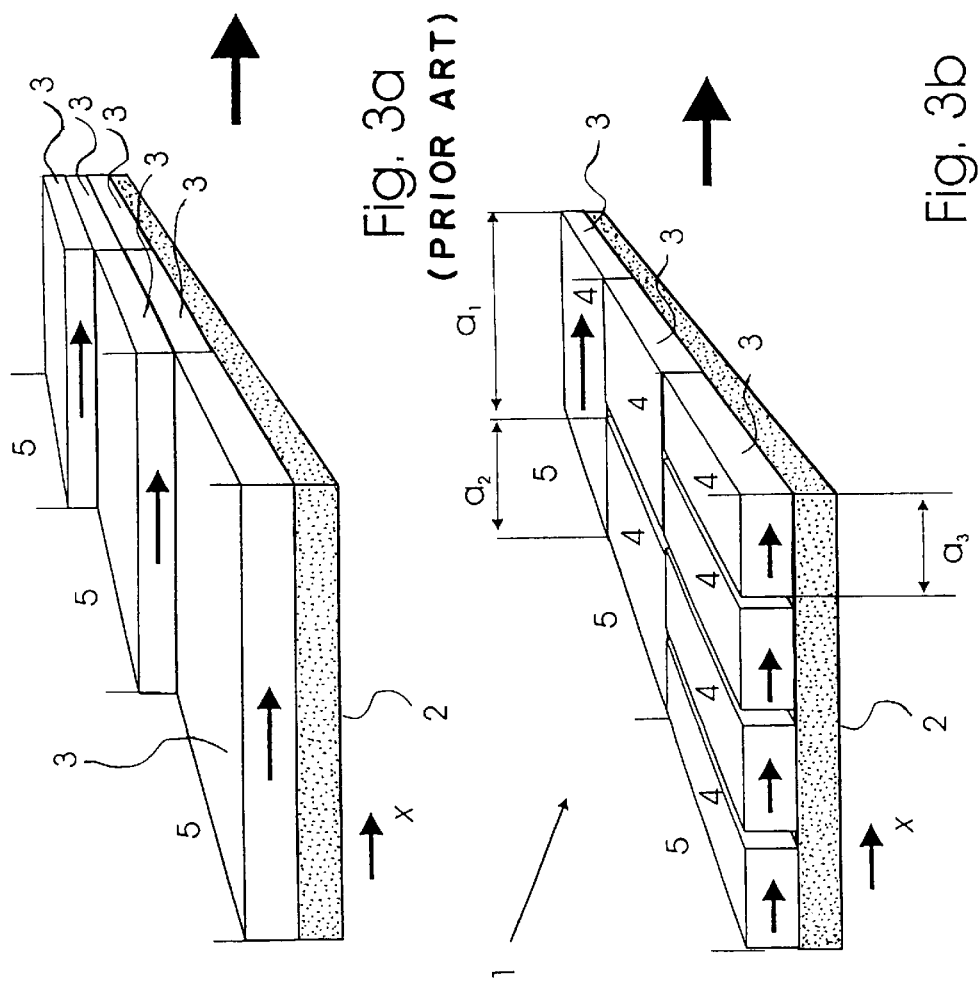
FIG. 3b is a view of a further identification element of the present invention and a schematic illustration of its characteristic signal.

The present invention circumvents these problems as becomes readily apparent from FIG. 2b and FIG. 3b. FIG. 2b shows an identification element 1 of the present invention having two regions 5, whilst FIG. 3b shows an identification element 1 having three different regions 5. Each region 5 provides its individual contribution to the resultant characteristic signal A(t) of the identification element 1. The regions 5 are arranged normal to the direction of the preferred axis x of the soft magnetic material 2. Arranged in the individual regions 5 are sections 4 of different lengths a in the direction of the preferred axis x. While in the upper region 5 the semihard or hard magnetic material 3 covers the underlying soft magnetic material 2 completely, the lower region 5 is subdivided into four sections 4 of a length a. As a comparison between FIG. 2b and FIG. 3b shows, two regions 5 with sections 4 of different lengths (FIG. 2b) produce a signal shape A(t) different from that produced by three regions 5 in which sections 4 of different lengths are arranged (FIG. 3b).

I claim:

1. An identification element which operates in an external alternating magnetic field, comprising:

a layer of soft anisotropic magnetic material exhibiting an preferred axis, high permeability and low coercive force, which on the application of the external alternating magnetic field generates a characteristic signal which is at its maximum level when said preferred axis is oriented parallel to the external alternating magnetic field; and a layer of hard or semihard magnetic material of low permeability and high coercive force which is arranged on said soft layer or in immediate proximity thereto, with said layer of hard or semihard magnetic material having regions differing in magnetization, wherein:

said regions of differing magnetization extending normal to said preferred axis;

said regions of differing magnetization containing sections of semihard or hard magnetic material arranged to have a gap therebetween; and said sections in each region differing in length in the direction of said preferred axis.

2. The identification element as defined in claim 1, wherein:

said semihard or hard magnetic material exhibit essentially the same intensity of magnetic bias in all said regions.

3. A method of manufacturing an identification element which operates in an external alternating magnetic field, the identification element comprising a layer of soft anisotropic magnetic material exhibiting a preferred axis, high permeability and low coercive force, which on the application of the external alternating magnetic field generates a characteristic signal which is at its maximum level when said preferred axis is oriented parallel to the external alternating magnetic field, and semihard or hard magnetic material of low permeability and high coercive force which is arranged on said soft layer or in immediate proximity thereto, with said layer of semihard or hard magnetic material having regions differing in magnetization, the method comprising the steps of:

arranging said regions to extend normal to said preferred axis;

providing said regions of differing magnetization with sections of semihard or hard magnetic material which are arranged to have a gap therebetween; and arranging said sections in each region to differ in length in the direction of said preferred axis.

4. The method as defined in claim 3, further comprising the steps of:

applying said semihard or hard magnetic material to said soft layer in the form of a continuous layer; and removing portions of said semihard or hard magnetic material between sections.

5. The method as defined in claim 4, wherein said removal takes place by means of photo-chemical action.

6. The method as defined in claim 4, wherein said removal takes place by mechanical means.

7. The method as defined in claim 4, wherein said semihard or hard magnetic material is impressed into an open pattern in each region.

* * * * *